J. C. LEFFEL.
Corn-Planter.
No. 40,760.
Patented Dec. 1, 1863.
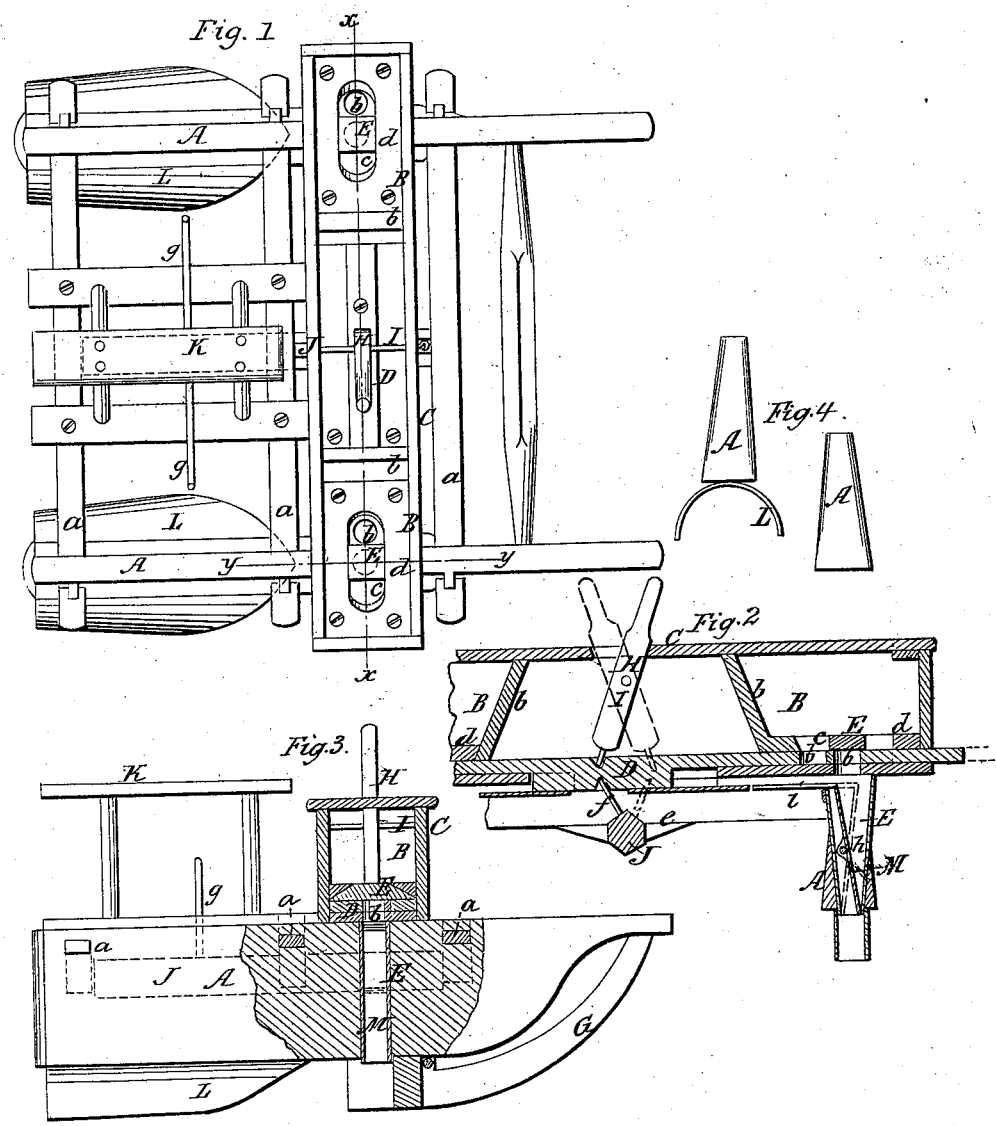
Witnesses:
J. W. Coombs
Geo. W. Reed
Inventor:
J. C. Leffel
per Munn & Co.
Attys.

UNITED STATES PATENT OFFICE.

J. C. LEFFEL, OF SHELBINA, MISSOURI.

IMPROVEMENT IN CORN-PLANTERS.

Specification forming part of Letters Patent No. 40,760, dated December 1, 1863.

*To all whom it may concern:*

Be it known that I, J. C. LEFFEL, of Shelbina, in the county of Shelby and State of Missouri, have invented a new and Improved Corn-Planter; and I do hereby declare that the following is a full, clear, and exact description of the same, reference being had to the accompanying drawings, making a part of this specification, in which—

Figure 1 is a plan or top view of my invention; Fig. 2, a transverse vertical section of the same, taken in the line $x\,x$, Fig. 1; Fig. 3, a longitudinal vertical section of the same, taken in the line $y\,y$, Fig. 1; Fig. 4, a rear end view of a runner of the machine and one of the covering-shares.

Similar letters of reference indicate corresponding parts in the several figures.

To enable those skilled in the art to fully understand and construct my invention, I will proceed to describe it.

A A represent two parallel runners, which are connected by cross-bars $a$, and are rounded at their front ends, similar to sled-runners, as shown clearly in Fig. 3. These runners are of wood, and they are of beveled form in their transverse section, as shown in Fig. 4, the runners gradually increasing in thickness from their upper to their lower edges.

On the runners A A there are secured transversely two seed-boxes, B B, which may be contained within a case, C, the said boxes being formed by partitions $b$ within the case C.

D is a slide-bar, which extends the whole length of the case C, the ends of said bar working through the ends of the boxes B B. This slide-bar D has two holes, $b\,b$, made through it near each end, and said holes work underneath oblong openings $c$, made in the bottoms $d$ of the seed-boxes B, as shown clearly in Fig. 1. Each of these openings $c$ has a piece of gum or india-rubber, E, inserted centrally in it, and secured therein by beveling the ends of the gum or rubber and fitting the beveled ends in beveled recesses made in the under sides of the bottoms $d$, as shown clearly in Fig. 3. These pieces of gum or india-rubber E serve as cut-offs, and they are in line with tubes F, which are fitted vertically in the runners A A, and are of taper form, as shown in Fig. 2.

To the front part of each runner A there is attached a cutter, G, and these cutters are rounded or curved, as shown in Fig. 3, and their back ends are divaricated or forked to admit of the seed passing down through them from the tubes F. The slide-bar D has the lower end of an upright lever, H, fitted in it, said lever working on a rod, I, which passes transversely and centrally through the upper part of the case C.

J is a rock-shaft fitted longitudinally in the machine, the bearings $e$ being attached to the under sides of two of the cross-bars $a$. This rock-shaft has an arm, $f$, attached to it, the upper end of which is fitted in the under side of the bar D. This shaft J has two rods, $g\,g$, attached to it, which project laterally from the shaft at opposite sides and serve as treadles, which are actuated by the feet of the driver while on his seat K. When desired the slide-bar D may be actuated through the medium of the lever H.

L L are covering-shares constructed of steel, plow-steel being preferable. These shares are bent or curved so as to be of semicircular form in their transverse section, and they are rounded at their front ends, so as to extend upward, like sled-runners, and gradually diminish in width from the commencement of their upward curve to their back ends. (See Fig. 1.) These covering-shares are attached to the under sides of the runners A A, and they extend nearly one-half of its length. They cover the seed in the most efficient manner, gathering the earth into the furrows at their front ends and compacting it around the seed at their back ends.

The gum or india-rubber cut-offs E E operate much more efficiently than the ordinary brushes hitherto used. They are not so liable to be affected by wear, and do not admit of the seed being forced out of the holes $b$ during the operation of the slide-bar D. By having the runners A of taper or beveled form in their transverse section strength with lightness is obtained.

In each tube F there is fitted a valve, M. These valves work or oscillate on central pivots, $h$, and they are connected at their upper ends by rods $i$ with the under side of the slide-bar D. These valves close the lower ends of the tubes F each time the corn is dropped into them, and when the holes $b$ are drawn out of line with the tubes F the valves M are opened to discharge the seed. In Fig. 2 a valve M is shown closed in blue tint, and shown open in red. The valves M should be made of spring-steel, and the tubes F may be of cast-iron.

Having thus described my invention, what I claim as new, and desire to secure by Letters Patent, is—

1. The rock-shaft J, provided with the treadles $g$ $g$, and connected with the slide-bar D through the medium of the arm $f$, for the purpose of operating the slide-bar D, as set forth.

2. The covering-shares L L, curved or bent, of semicircular form in their transverse section, rounded at their front ends, and gradually contracted toward their back ends, as set forth.

3. Constructing the runners A A so as to be of beveled or taper form in their transverse section, as and for the purpose specified.

J. C. LEFFEL.

Witnesses:
JOHN J. FOSTER,
M. P. THOMAS.